United States Patent
Menegoli et al.

(10) Patent No.: US 8,773,102 B2
(45) Date of Patent: Jul. 8, 2014

(54) HYSTERETIC CL POWER CONVERTER

(75) Inventors: Paolo Menegoli, San Jose, CA (US); Fabio Alessio Marino, San Jose, CA (US)

(73) Assignee: ETA Semiconductor Inc., San Jose, CA (US)

( * ) Notice: Subject to any disclaimer, the term of this patent is extended or adjusted under 35 U.S.C. 154(b) by 549 days.

(21) Appl. No.: 12/930,190

(22) Filed: Jan. 3, 2011

(65) Prior Publication Data

US 2012/0170334 A1   Jul. 5, 2012

(51) Int. Cl.
- *H02M 3/156* (2006.01)
- *H02M 3/158* (2006.01)
- *H02M 3/07* (2006.01)
- *H02M 1/00* (2006.01)

(52) U.S. Cl.
CPC .............. *H02M 3/07* (2013.01); *H02M 3/1588* (2013.01); *H02M 2001/007* (2013.01); *Y02B 70/1466* (2013.01)
USPC ............ 323/288; 323/222; 323/225; 323/282

(58) Field of Classification Search
USPC ......... 323/222, 224, 268, 271, 282, 284, 288, 323/350, 351; 363/59, 60; 327/536
See application file for complete search history.

(56) References Cited

U.S. PATENT DOCUMENTS

| | | | |
|---|---|---|---|
| 7,457,140 | B2 | 11/2008 | Klein |
| 8,085,011 | B1 * | 12/2011 | Petricek .......................... 323/259 |
| 2001/0035745 | A1 * | 11/2001 | Muratov et al. ................ 323/283 |
| 2002/0125872 | A1 * | 9/2002 | Groom et al. .................. 323/288 |
| 2003/0111989 | A1 * | 6/2003 | Kranz ............................. 323/283 |
| 2007/0120547 | A1 * | 5/2007 | Tateishi et al. ................ 323/282 |
| 2008/0042633 | A1 * | 2/2008 | Klein ............................. 323/288 |
| 2008/0088292 | A1 * | 4/2008 | Stoichita et al. .............. 323/285 |
| 2009/0284992 | A1 * | 11/2009 | Kenly et al. ................. 363/21.06 |
| 2010/0026271 | A1 * | 2/2010 | Ouyang ......................... 323/311 |
| 2010/0220416 | A1 * | 9/2010 | Yonezawa et al. .............. 361/13 |
| 2010/0264895 | A1 * | 10/2010 | Weng et al. .................... 323/285 |
| 2011/0148371 | A1 * | 6/2011 | Huang et al. .................. 323/271 |
| 2012/0161728 | A1 * | 6/2012 | Chen et al. .................... 323/271 |

OTHER PUBLICATIONS

K.I.Hwu, Y.T.Yau, KY Converter and Its Derivatives,IEEE Transactions on Power Electronics, vol. 24, No. 1,Jan. 2009.

* cited by examiner

*Primary Examiner* — Adolf Berhane
*Assistant Examiner* — Gustavo Rosario Benitez

(57) ABSTRACT

A novel switching hysteretic power converter is presented. The power converter combines the function of a capacitive charge pump with the function of an inductive step down converter to obtain a switching boost converter with a much simpler control method with respect to conventional inductive boost power converters. The hysteretic control provides stable operation in all conditions with excellent load transient response. Furthermore the hysteretic control allows high frequency switching reducing the size and cost of the passive components. The Discontinuous Conduction Mode of operation provides very high efficiency even at light loads. The presented power converter can be operated as a boost converter or as a buck converter simply by changing the switching phase of one switch. In both types of operation the efficiency of the hysteretic power converter can be quite high even at high switching frequencies.

19 Claims, 11 Drawing Sheets

HYSTERETIC CL POWER CONVERTER

BACKGROUND OF THE INVENTION

1. Field of the Invention

The present invention is in the field of power converters. The present invention is further in the field of semiconductor switching power converters. The present invention further relates to the field of integrated hysteretic non isolated control methods for switching power converters and circuits. The implementation is not limited to a specific technology, and applies to either the invention as an individual component or to inclusion of the present invention within larger systems which may be combined into larger integrated circuits.

2. Brief Description of Related Art

Modern electronic applications require power management devices that supply power to integrated circuits or more generally to complex loads. In general power switching converters are becoming more and more important for their compact size, cost and efficiency. The switching power converters comprise isolated and non isolated topologies. The galvanic isolation is generally provided by the utilization of transformers. The subject invention refers to non isolated power converters.

Modern switching power converters are in general divided in step down power converters also commonly known as "buck converters" and step up power converters commonly known as "boost converters". This definition stems from the ability of the converter to generate output voltages that are lower or higher than the input voltage regardless of the load applied.

Boost converters can be implemented by storing and releasing energy in a passive component and more precisely in a capacitor or in an inductor. In particular the case of capacitive charging is also known as charge pump converter while, when the inductor is used, the converter is generally known as inductive boost converter.

Figure 1:
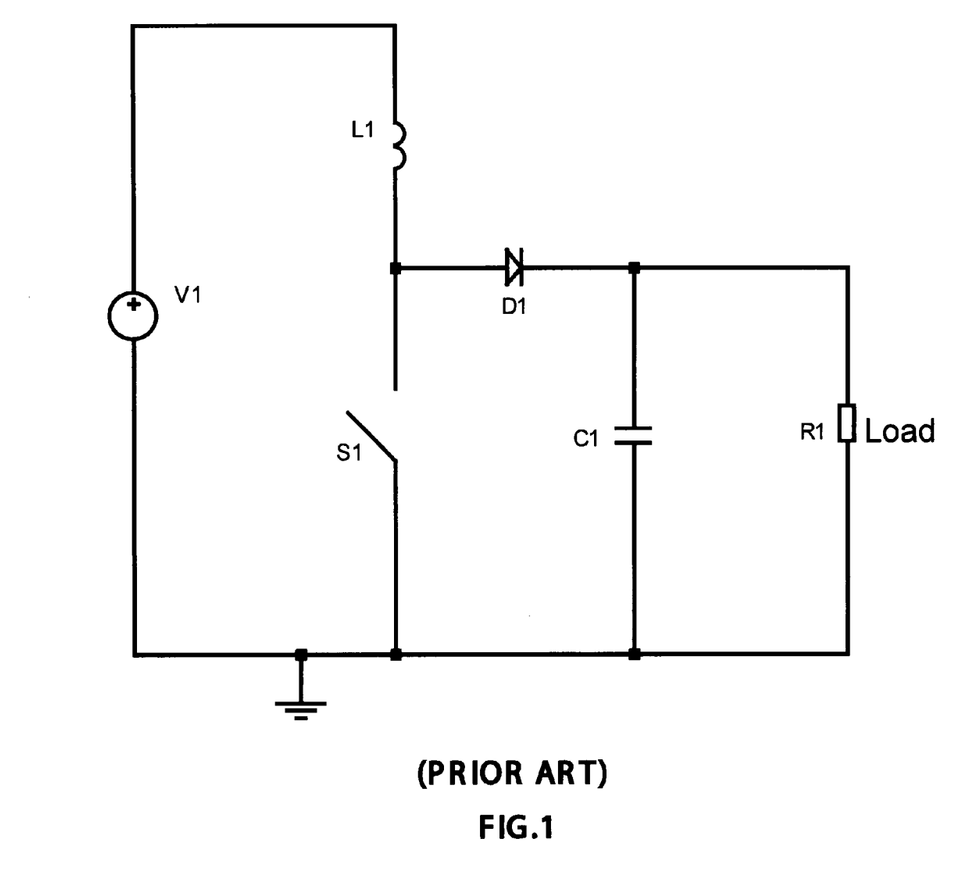
FIG. 1 shows a general inductive boost switching power converter core circuit topology (prior art).

Inductive boost converters are very important to generate well regulated voltage rails at voltages higher than the input voltage available. Typically, this is obtained by first charging the inductor with energy by applying a current through it and thereafter switching off a terminal of the inductor so as to discharge the current into a load at higher voltage. The most known and used prior art for a switching non isolated inductive boost converter topology is shown in FIG. 1.

The modes of operation of inductive switching power converters are mainly two. The first is the Continuous Conduction Mode (CCM) characterized by the fact that, at steady state, the inductor current increases and decreases with the switching frequency and duty cycle but it is never kept at zero during the duty cycle. CCM generally occurs when the load current is high enough to require a positive inductor current and therefore a constant flow of energy from the input to the output. If and when the inductor current crosses a zero value the converter can be kept in CCM by allowing the inductor current to become negative and therefore discharging the output capacitor.

The second mode of operation is the Discontinuous Conduction Mode (DCM) characterized by the fact that when the inductor current reaches zero value, it is kept at zero for part of the period. This second mode is generally entered to when the load current is small. If the load current is not very large the output capacitor can provide enough energy to the load for part of the switching period so that during that time interval the inductor energy can be null. Typically, in DCM the output voltage ripple is more pronounced since the energy is stored also in the output capacitor so as to allow lower switching frequency.

Fast control of boost converters is difficult to obtain in CCM because there is always an intrinsic delay in providing energy to the load since the inductor has to be first charged with current flowing in it. If the load suddenly changes from a low current to a high current load, the boost converter circuit has to spend some time to charge the inductor first and during this time no current/energy is supplied to the load. This phenomenon is not present in buck converters where by applying current to the inductor, the same current is flowing in the load as well.

The small signal analysis of the boost circuit in CCM points out to the presence of a right half plane zero (RHPZ). This is the effect that an increase of load current causes an apparently counter-intuitive decrease of the current in the diode due to an increase of duty cycle. This RHPZ can complicate the stability of the loop and generally is dealt with by rolling off the loop gain of the switching voltage regulator at relatively low frequency, making the overall response of the boost converter quite slow.

Generally the boost converters are controlled with PID (proportional-integral-derivative) type of control method. In particular current mode controls are quite common because they include two nested loops: one for the control of the output voltage and one for the control of the output current. However, as mentioned, these types of control methods do not present high bandwidth and require the adoption of large output capacitors to obtain acceptable load transient responses.

High frequency switching power converters are increasingly more popular due to the advantage of using low value inductors and capacitors reducing significantly the cost and board space of the power management section. Buck converters can successfully be operated at high frequency by using hysteretic and pseudo-hysteretic approaches. Generally the control loop of pseudo-hysteretic converters is simple and the output voltage is summed to a ramp signal to generate a synthetic ripple. A prior art example of pseudo hysteretic switching buck converter is provided in Klein (U.S. Pat. No. 7,457,140).

This signal is fed to a fast comparator that determines the charge and discharge timing of the inductor. For buck converters the implementation of a pseudo hysteretic control is relatively simple because the output stage of the buck, along with the inductor and the output capacitor, forms the integrating section of the converter that can be seen as a delta sigma converter. As mentioned, the buck converter charges the inductor while supplying current to the load.

The intrinsic delay of the boost architecture makes the implementation of an hysteretic approach much more difficult to obtain. However alternative approaches are possible. For instance a boost converter could be obtained by cascading a capacitor charge pump converter with an inductive buck converter. In that case the buck can be regulated with simpler and faster control loops to obtain high frequency operation and faster load transient responses.

Figure 2:
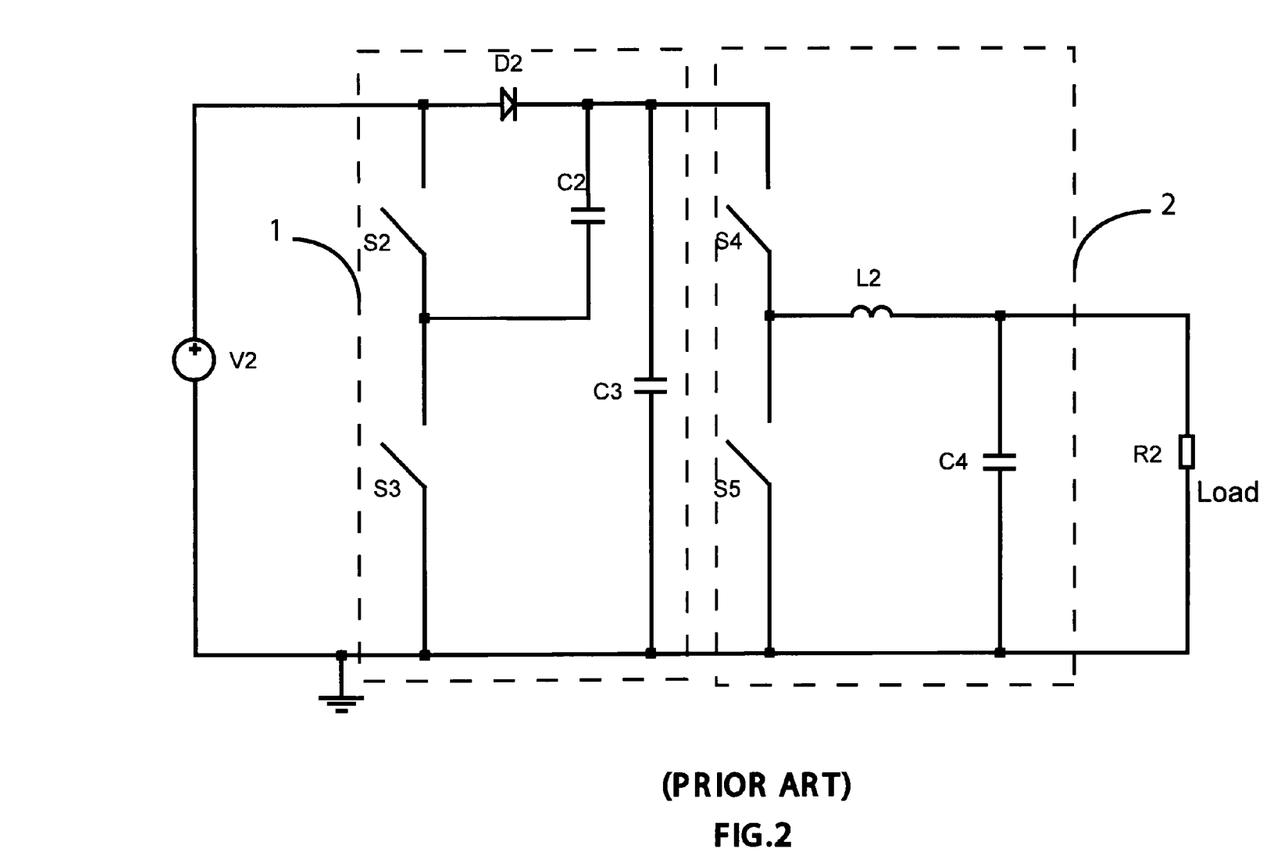
FIG. 2 shows a schematic of a combination of a capacitive charge pump and an inductive step down converter.

The mentioned approach for the case in which the output voltage is smaller than twice the input voltage is illustrated in FIG. 2. The block 1 is the charge pump converter while the block 2 represents the inductive buck converter. For output voltages higher than 2× the input voltage, multiple stages of the charge pump circuit are needed. In these cases the charge pump is not regulated but simply operated to multiply the input voltage in an uncontrolled way as long as the provided output current is at least equal to the output load current.

However, due to the higher complexity of the circuit, its higher cost, the higher number of components and the lower overall efficiency, the applicants are not aware of any high volume industry adoption of the mentioned approach. An interesting observation is that if the capacitor C3 of FIG. 2 is removed, the input voltage to the regulated buck converter is already toggling between the boosted voltage and the input voltage (minus a diode D2 voltage drop).

Figure 3:
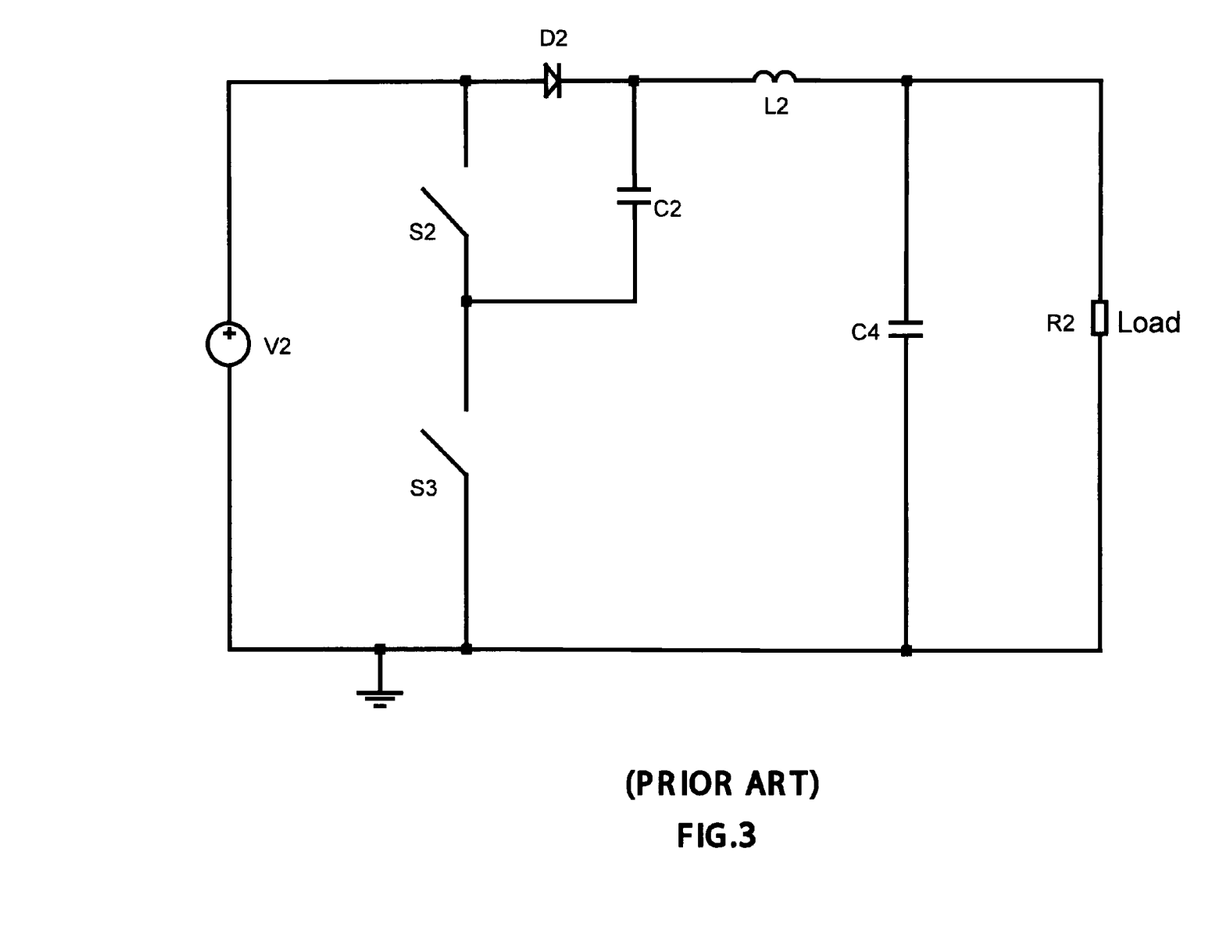
FIG. 3 shows a schematic of a combination of a capacitive charge pump and an inductive step down converter obtained by reducing the number of components of FIG. 2.

Therefore the switches S4 and S5 of FIG. 2 can be omitted and if the inductor L2 is coupled between the output capacitor C4 and the boosting capacitor C2, as shown in FIG. 3, the output voltage of the overall circuit can be regulated approximately between 2*Vin and Vin by modulating the duty cycle of the switches S2 and S3. In this case, the boosting capacitor C2 has to be large enough to transfer enough energy during the boosting phase almost independently from the duty cycle. Since the inductor sees a voltage that toggles approximately between 2*Vin and Vin, the Vout/Vin transfer function is Vout=Vin+Vin*D, where D is the duty cycle of the converter.

A similar method but with simplified circuit topology was described in a paper by K. I. Hwu and Y. T Yau ("KY Converter and Its Derivatives" published on IEEE Transaction on Power Electronics—January 2009). The presented converter, in its simplest form, is again characterized by a Vout/Vin transfer function equal to 1+D where D is the duty cycle of the converter. However the control method used in the presented converter is a conventional PID, the switching frequency is very low (195 KHz) and most importantly it is meant to operate always in CCM for any load condition. These major limitations make this solution very unattractive for real applications and in particular for high frequency applications.

It is therefore a purpose of the present invention to describe a novel structure of a switching CL (capacitive-inductive) boost converter that operates at high switching frequency with pseudo-hysteretic control and operating both in CCM and DCM depending on the load conditions.

SUMMARY OF THE INVENTION

It is an objective of the present invention to provide an inductive boost switching power converter that can operate at high switching frequency therefore allowing a reduction of the value, size, and cost of its passive components.

It is another objective of the present invention to provide a switching boost power converter that includes an hysteretic or pseudo-hysteretic control circuit by means of a feedback network that generates a signal containing the information of output voltage, both from a dc standpoint and from an ac standpoint, and of inductor current allowing very fast load transient response.

It is another objective of the present invention to provide a switching boost converter with high efficiency at any load condition by means of control of CCM (Continuous Conduction Mode) mode of operation and DCM (Discontinuous Conduction Mode) mode of operation depending on the load values.

It is another objective of the present invention to provide a novel CL (capacitor inductor) switching power converter that can be easily and adaptively operated as a boost and/or as a buck converter maintaining an hysteretic control.

The present invention describes an inductive switching boost converter that combines the components for a capacitive charge pump boosting circuit with the ones for an inductive buck converter. The combination of the two circuit topologies allows a reduction of the total number of components and it comprises the function of a relatively uncontrolled boost operation cascaded with a regulated step down converter.

The present invention further describes a boost power converter that can operate at high switching frequencies by incorporating a pseudo hysteretic approach. The circuit proposed is relatively simple even though the detailed characteristics of the power converter such as its efficiency at different load conditions, the output voltage ripple in different load conditions, and the response to the load transient depend on the overall implementation and on the value of the output capacitor, output inductor, input voltage, output voltage and switching frequency.

Figure 4A:
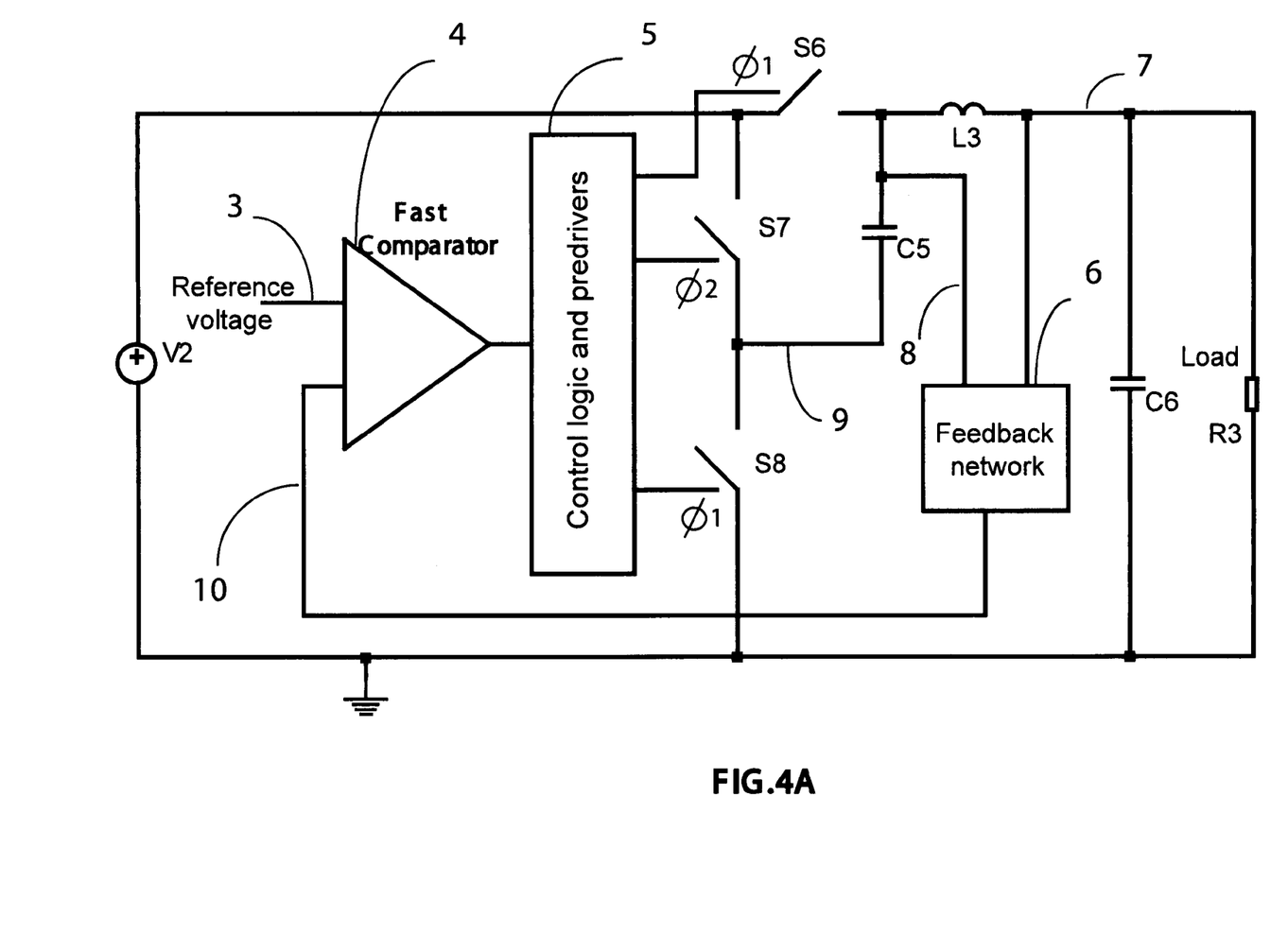
FIG. 4A shows a schematic of the hysteretic boost converter according to one of the embodiments of the present invention.
Figure 4B:
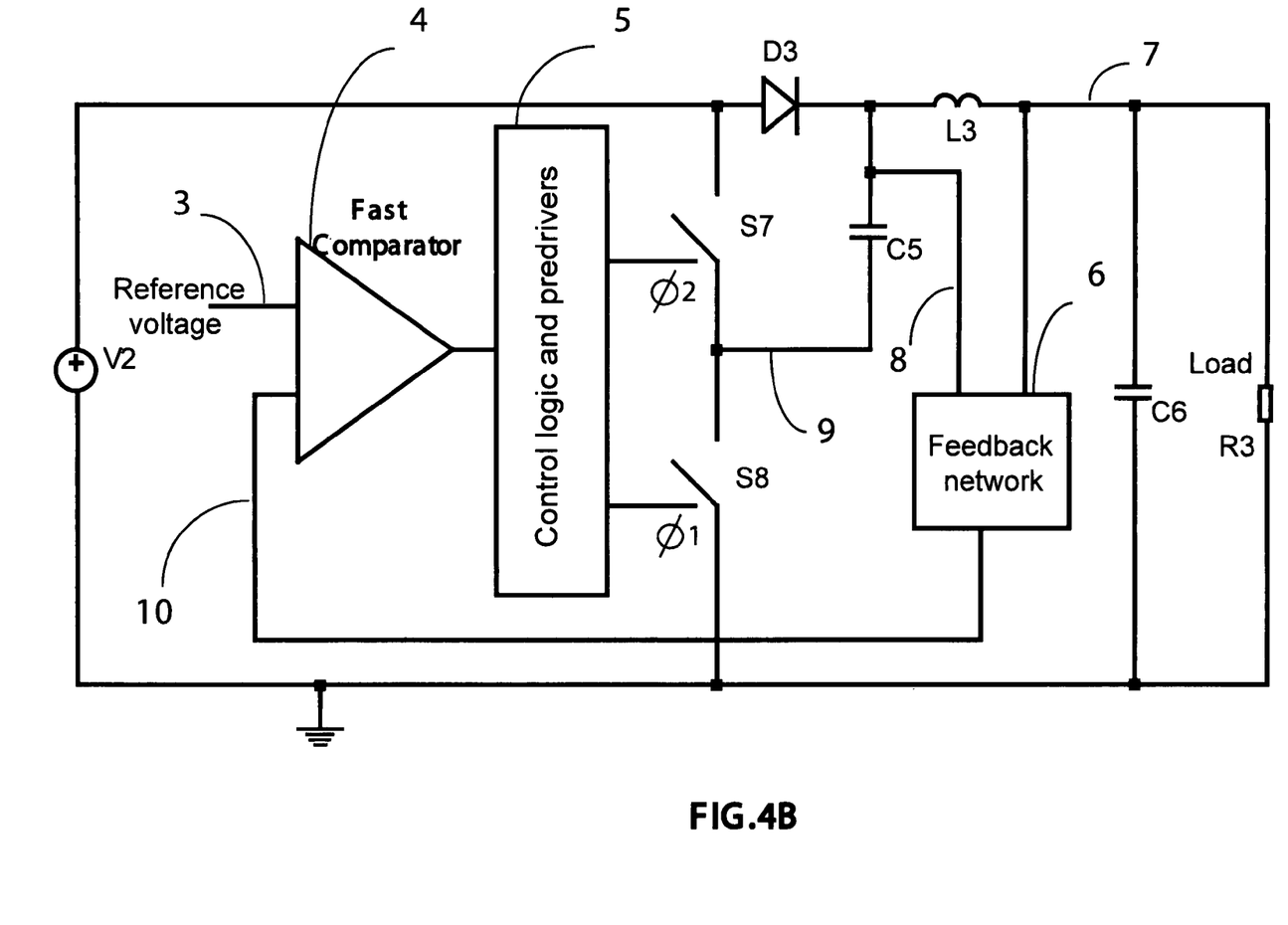
FIG. 4B shows a schematic of the hysteretic boost converter according to one of the embodiments of the present invention where one of the switches of FIG. 4A is replaced by a diode.

The present invention, in one of its embodiments, shown in FIG. 4, further describes a passive or active feedback network 6 to generate a signal 10 that is fed to a fast comparator 4 whose output signal is used by a control logic and an output stage pre-driver block 5 to determine the converter duty cycle and ultimately its output (node 7 in FIG. 4) voltage regulation. The fast comparator 4 compares the signal 10 generated by the feedback network 6 with a voltage reference 3 or similar voltage. The comparator can include hysteresis or not. The output of the comparator provides a signal in a digital form to be processed by a logic circuit 5 to drive the output switching stage of the boost converter, indicated in FIG. 4 with the switches S6, S7 and S8.

The switches S6 and S8 are switched with the same frequency and phase $\phi 1$. In the alternate phase $\phi 2$ the switch S7 is toggled. In the phase $\phi 1$ the capacitor C5 is charged approximately at the voltage V2 and the inductor L3 is discharged. In the phase $\phi 2$ the voltage at the node 8 is boosted and the inductor is charged. During the phase $\phi 1$ the inductor current is re-circulated partially in the switch S6 and partially in the capacitor C5 through the switch S8.

Typically the feedback network 6 can have a few input signals among which the output regulated voltage 7 of the boost converter and the voltage of the switching node 8. The output 10 of the feedback network 6 is a signal that creates the synthesis of a ripple voltage applied to the output 7 by the charging and discharging of the inductor energy. The signal 10 at the output of the feedback network assumes the shape of a voltage ramp providing adequate overdrive to the stages of the comparator 4. This ramp signal 10 has two contributions: a DC contribution that controls the output voltage to be regulated at the desired value and an AC contribution that governs the switching frequency and contributes to a fast load transient response.

The topology and values of the components in the feedback network define the self oscillating switching frequency, the stability, and the load transient response performance of the whole converter. The switching frequency has a direct impact on the output voltage ripple and on the converter efficiency. The switching frequency can be regulated and imposed by a separate frequency control loop that can be implemented in various ways. When the switching frequency is regulated, for example by means of a PLL (Phase Lock Loop), the study of the loop becomes more complex and an accurate analysis can be performed by periodic state analysis to guarantee the circuit stability in all conditions.

The methods and means for regulating the switching frequency are beyond the scope of the present invention and do not affect its novelty. The several methods and techniques to regulate the switching frequency are well known to anyone skilled in the art.

The feedback network 6 is typically composed of passive components but, more in general, it could include active components and have different functions depending on the load conditions and on whether the converter is in CCM or DCM mode of operation. Furthermore the feedback network may include a resistor divider to scale down the output voltage to a desired voltage or, in alternative the scaling divider may be external to the feedback network block. As mentioned, the switching node 8 is an input to the feedback network, but a different signal could be used as well, such as the signal 9 at the other terminal of the capacitor C5.

The implementation of FIG. 4 utilizes the switch S6 to achieve higher efficiency but the same general considerations are valid if the switch S6 is replaced by a simple diode as in FIG. 2 and FIG. 3. The proposed circuit topology is amenable to operate at high switching frequency because the loop does not comprise complex stability networks that introduce delays. The two main blocks in the loop are the fast comparator and the feedback network. The switching frequencies for the proposed topology can be in the order of many tens of MHz allowing much smaller inductor and capacitors values.

In the case of very high switching frequencies it may be advantageous to use a diode in place of the switch S6 to optimize conversion efficiency but that is dependent on the operating currents and on the process technology available for the application. The value of the capacitor C5 has to be adequate to allow the desired transfer of energy when switching and that is generally linked to the load current.

When the load current is low enough, the inductor current reaches the zero value. If the control loop operates in CCM the inductor current becomes negative impacting adversely the converter's efficiency. It is therefore advantageous to monitor the inductor current, turn off all the switches when the inductor current reaches zero and resume switching when the ramp signal at the output of the feedback network toggles the fast comparator. The inductor charging phase can then be kept active for a predetermined amount of time seeking the optimum trade-off between the switching frequency and the output voltage ripple with the purpose of maximizing the overall converter efficiency. This mode is the DCM mode of operation and it is characterized by a lower switching frequency.

The lower the switching frequency the higher the output voltage ripple for a given inductor and output capacitor value. It may be desirable to allow higher output voltage ripple in order to obtain higher efficiency at light loads. The re-circulating inductor current is partially flowing in the switch S6 and partially in the switch S8 through the capacitor C5. However the largest portion of the inductor current is flowing in the switch S6, therefore the inductor current is monitored by sensing the current in S6 since it is accurate enough to assume that when the current in the switch S6 is approaching zero, so is the inductor current.

Figure 5:
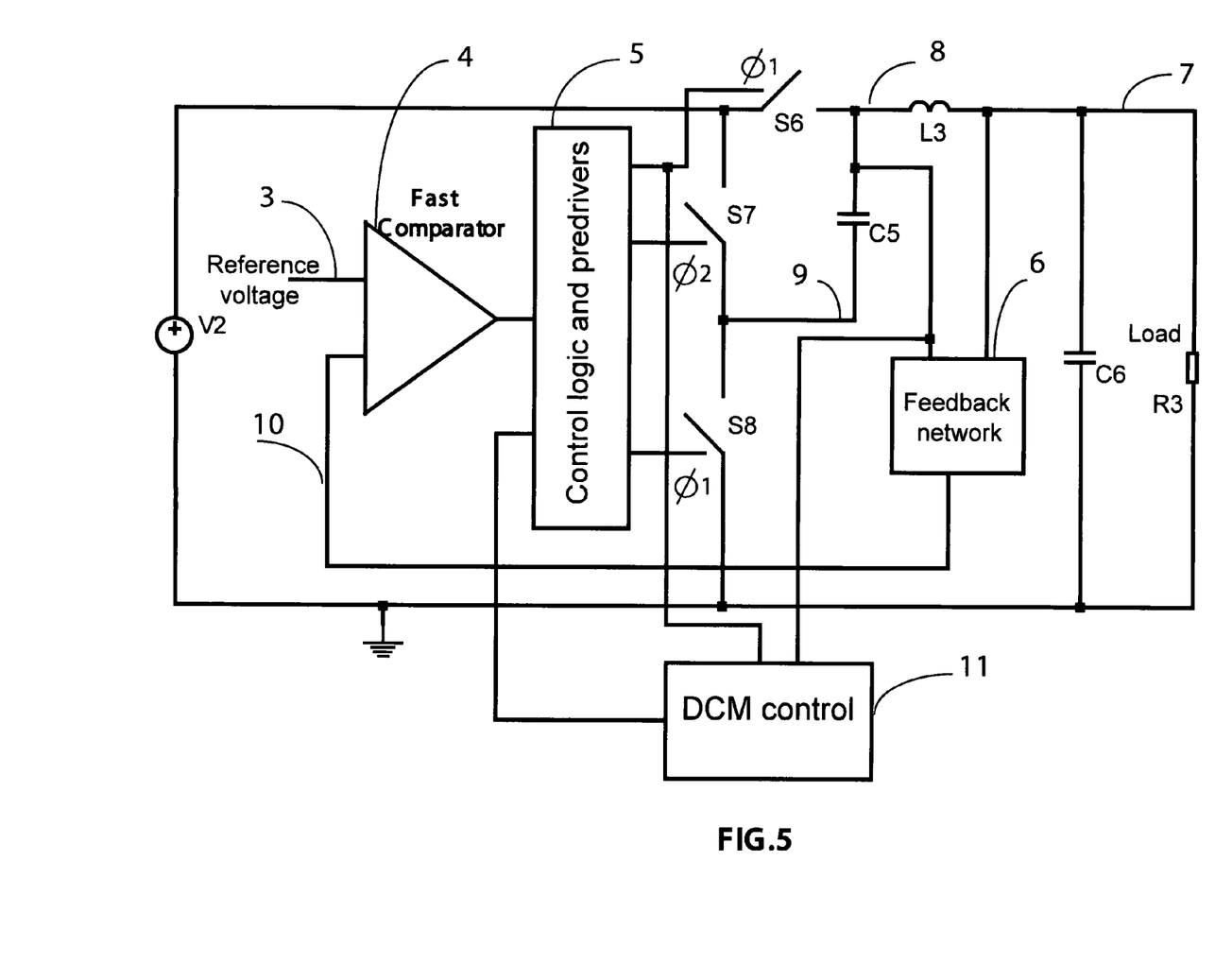
FIG. 5 shows a schematic of the hysteretic boost converter with DCM mode according to the preferred embodiment of the present invention.

FIG. 5 shows the boost converter with the DCM control block 11 that monitors the inductor current by sensing the voltage of the node 8 when the switch S6 is on and whose output feeds the control logic and pre-drivers block 5. In FIG. 5 it is assumed that the supply voltage V2 is provided as well to the block 11 so that the differential voltage drop across the switch S6 can be measured and, by knowing its on-resistance, an estimate of the flowing current could be made. If and when the switch S6 is replaced by a diode the sensing of the current flowing through it may be more problematic and a small sense resistor in series to the inductor may provide the required information to operate in DCM with accurate result.

It should be noted that the circuit could be left in CCM for a few clock cycles even after a zero inductor current has been detected so that by inverting the inductor current for the first few cycles after the load transient occurrence, the transient response could be improved and optimized by minimizing the amplitude of the output voltage spikes and glitches without negatively impacting the overall efficiency. However by keeping the low side switch S8 on for a longer time, the inductor current cannot be reversed to large values because the capacitor C5 prevents a DC current flow from occurring. This leads to the consideration that large values of the capacitor C5, although not desirable in terms of size and cost, may contribute to reduce the output voltage spikes when the output load current is abruptly decreased.

The adoption of the switch S6 in place of the diode, although more cumbersome to drive at high switching frequencies, may provide the initial surge current control at start up which is very important for battery supplied power converters. This feature is impossible to obtain with the diode. The initial phase of operation of the boost converter has to be set by means of open loop forced switching (for example by means of maximum on time of the high side switch) or by the implementation of a separate loop distinct from the hysteretic loop. This is desirable until the output voltage has reached the regulation value, after which the hysteretic loop can be phased in.

This different mode of operation when the output voltage is not close to the desired final value is inherent in the nature of the hysteretic loop for a boost converter. Possibly this could be implemented by using a multi-mode feedback network that allows soft start and adaptive operation. However this is beyond the scope of the present invention.

Figure 6A:
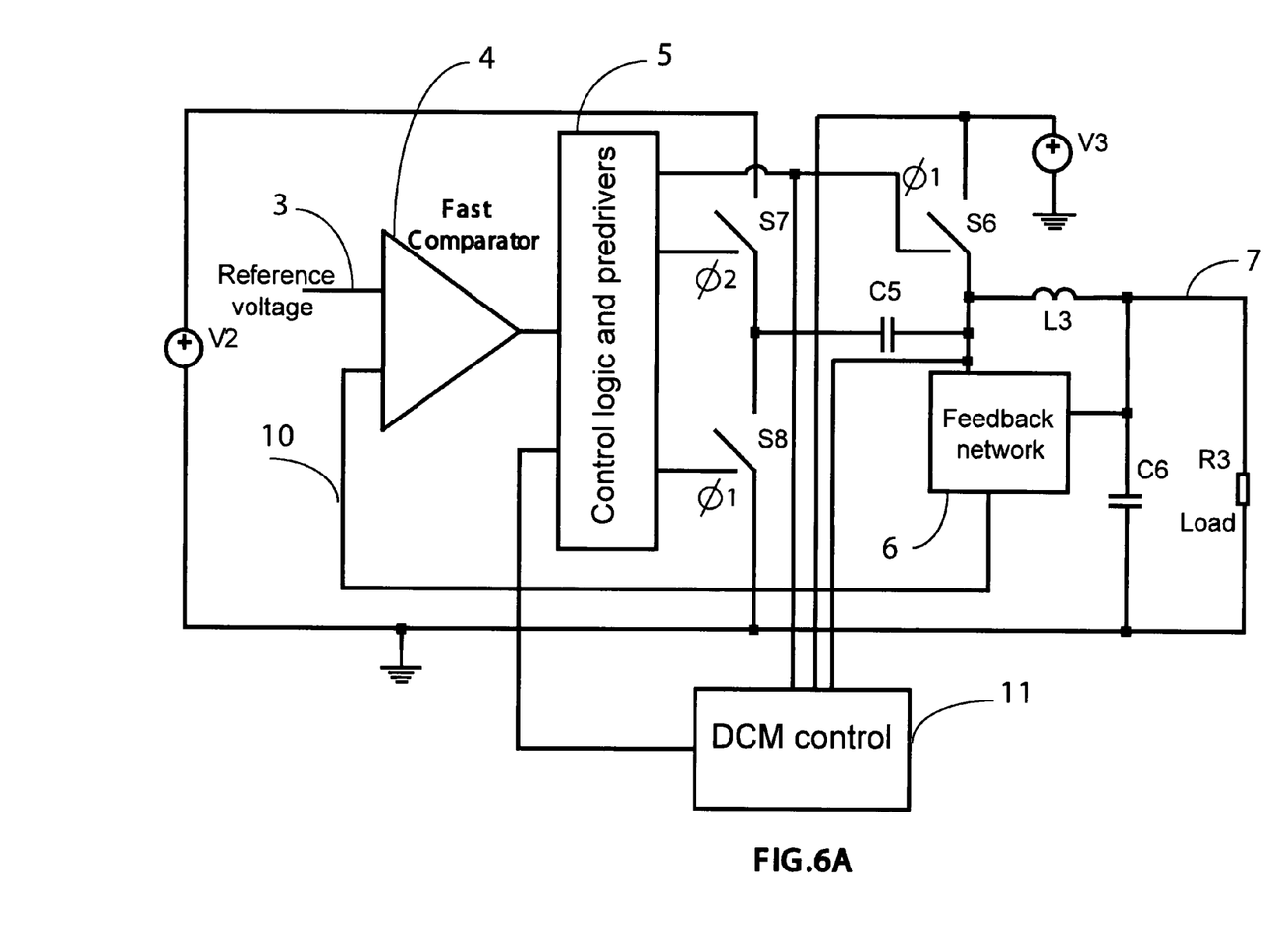
FIG. 6A shows the schematic of the hysteretic boost converter with DCM mode according to an alternative embodiment of the present invention.
Figure 6B:
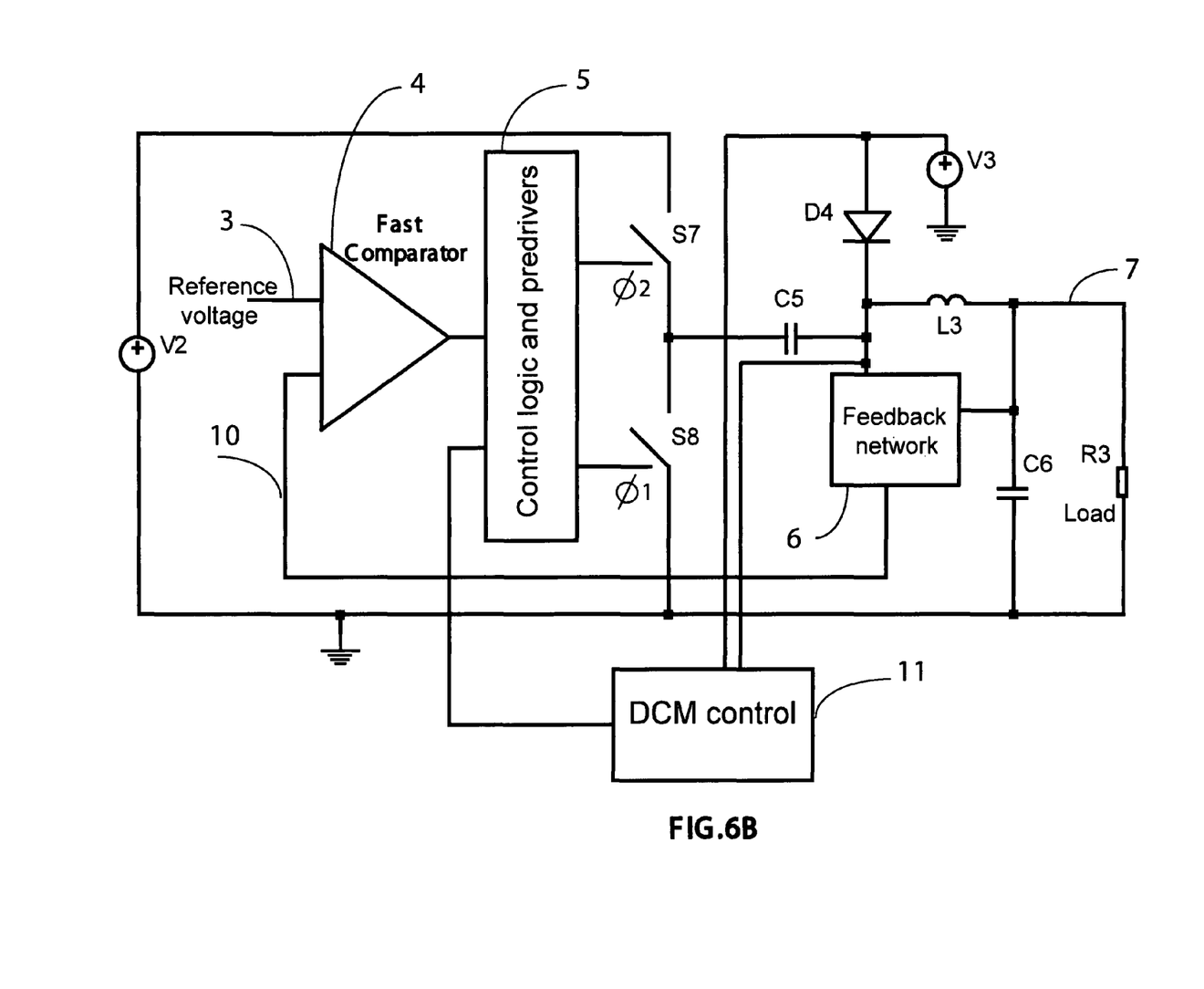
FIG. 6B shows the schematic of the hysteretic boost converter with DCM mode similar to the one of FIG. 6A where one of the switches is replaced by a diode.

The largest disadvantage of this switching power converter topology is that an extra switch and an extra capacitor are needed with respect to a conventional inductive boost. However if the terminal of the switch S6 coupled to the supply V2 of FIG. 5 is separated and connected to a separate supply V3 as shown in FIG. 6, the converter can be operated at lower voltage V2 and boost the voltage of the second supply V3 to the voltage V2. If for instance the desired output voltage is 4.3V, V2 is 1.8V and V3 is a battery voltage varying between 2.5V and 4.0V, the switches S7 and S8 may be implemented in a smaller lithography process technology and switched at high frequency with high efficiency.

Furthermore the size of the section of the boost converter under the lower voltage V2 can be significantly smaller in silicon area and lower in cost. This may offset the increased cost and size of the extra capacitor and switch. The capacitor C5 is still required and, in fact the reduction of the voltage of a section of the boost may impose an increase of the size of the boosting capacitor C5 in order to transfer the same energy to the load, but possibly a smaller capacitor value may be utilized if the converter is operated at high frequency. The rest of the circuit shown in FIG. 6 is identical to the one shown in FIG. 5, and all the other considerations still apply.

Figure 8:
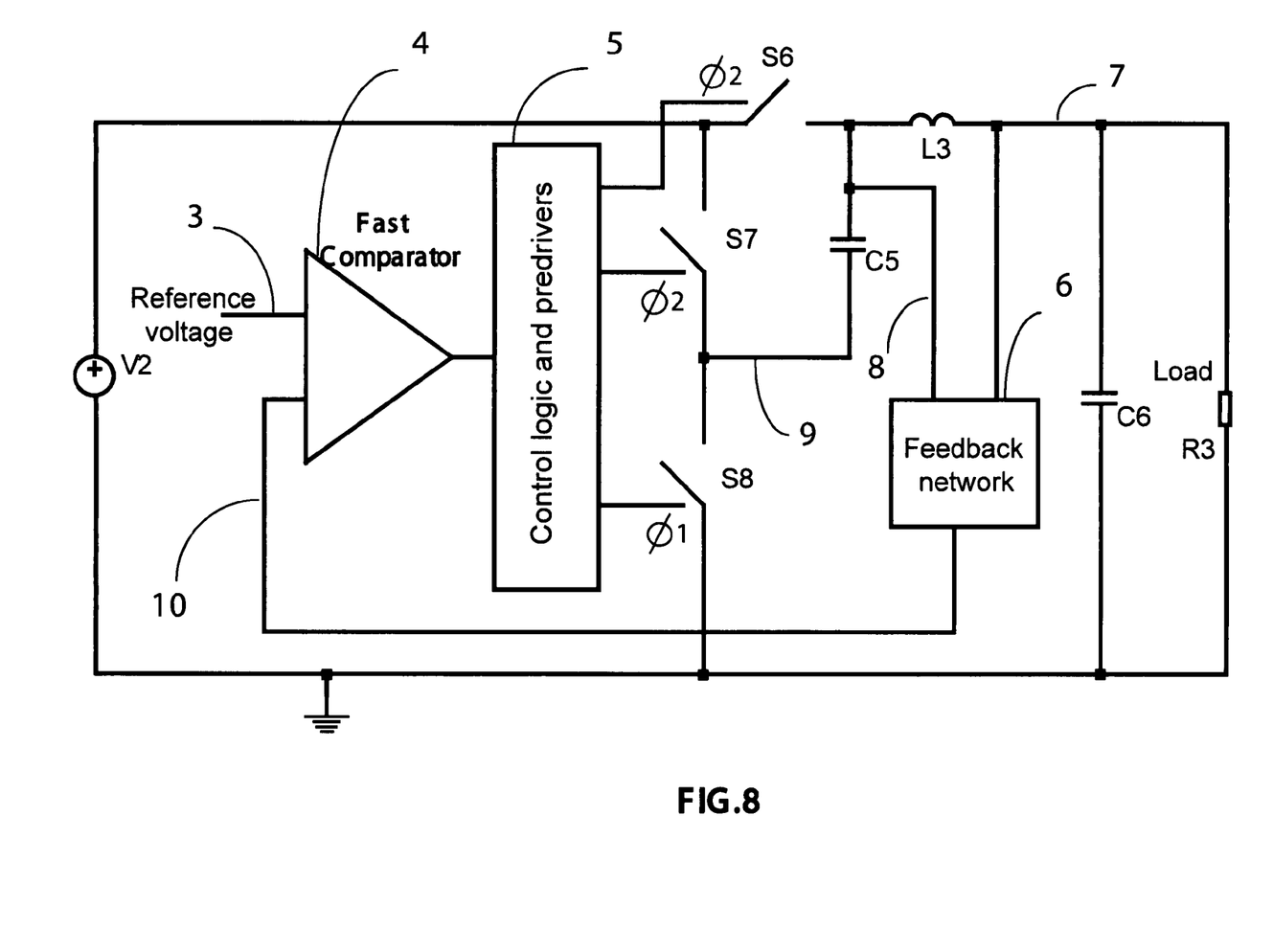
FIG. 8 shows the schematic of the hysteretic converter in its buck configuration according to a further embodiment of the present invention.

The switch S6 is operated in synchronism with the low side switch S8, however if the switch S6 is toggling in phase with the high side switch S7, as shown in FIG. 8, the converter operates as a buck providing an output voltage lower than its input voltage. In that case the boosting capacitor C5 is no longer acting as a boosting capacitor. It simply stores a portion of the inductor energy during re-circulation, and gets discharged during the inductor energy charging phase.

The voltage of the node 8 is modulated between the supply voltage V2 and the voltage at which the capacitor is discharged, therefore the Vout/Vin transfer function is equal to D, where D is the duty cycle of the converter. This transfer function is typical of the buck switching converters. However the analytic study of the converter during the re-circulating phase is not trivial because the circuit operates as a resonating one. Anyway the rest of the circuit, including the feedback circuit, is exactly the same as the one shown for the boost configuration.

The switching power converter in buck mode can operate at the same high frequency used for the converter in boost mode and its efficiency is also very high. In the case that the input voltage could vary between a value lower and one higher than the desired output voltage the converter may implement a buck boost operation by monitoring the input voltage versus the output voltage and by toggling the phase of the switch S6 to operate as a boost or as a buck power converter. This effective advantage makes this circuit topology very attractive for some applications.

When operating as a buck converter the value of the capacitor C5 can be quite small and easily be integrated in an IC (integrated circuit) but the value of the capacitor C5 affects directly the free oscillating switching frequency of the converter, since it is related to the voltage swing for the input of the feedback network. At lower capacitor values the switching frequency tends to be lower resulting in higher output voltage ripple, but a separate switching frequency control loop can be implemented to overcome this difficulty.

Also in this step down configuration the DCM mode can be easily implemented by turning off all the switches, when the inductor current reaches the zero value, for a portion of the resulting switching cycle. In this mode the re-circulation inductor current is flowing in the low side switch S8 and, therefore, a simple monitoring of the voltage of the node 9 is sufficient to indicate when the inductor current reaches the null value to start the DCM mode of operation.

As is clear to those skilled in the art, this basic system can be implemented in many specific ways, and the above descriptions are not meant to designate a specific implementation.

BRIEF DESCRIPTIONS OF THE DRAWINGS

The features, objects, and advantages of the present invention will become apparent upon consideration of the following detailed description of the invention when read in conjunction with the drawings in which.

DETAILED DESCRIPTION OF SPECIFIC EMBODIMENTS

A FIG. 4

FIG. 4 is showing the first general embodiment of the invention. In particular FIG. 4 shows the schematic of the block diagram of the pseudo-hysteretic switching boost converter. FIG. 4 describes a novel approach in which a capacitive charge pump circuit boosts the voltage to a value higher than the desired output voltage and a successive inductive step down converter regulates the voltage to the desired value with high efficiency. However in FIG. 4 some of the components of the two mentioned blocks are merged or eliminated to form a novel circuit topology.

The circuit has two nodes, (8 and 9) that are switching. In particular the node 9 is toggled between the input voltage V2 and ground. The node 8 is switching between the input voltage V2 and potentially approximately 2 (two) times V2. Therefore appropriate modulation of the duty cycle can result in a regulated output voltage of the converter with any value between the input voltage and twice the input voltage.

FIG. 4 describes a passive or active feedback network 6 to generate a signal 10 that is fed to a fast comparator 4 whose output signal is used by a control logic and an output stage pre-driver block 5 to determine the converter duty cycle and ultimately obtain its output (node 7) voltage regulation. The fast comparator 4 compares the signal 10 generated by the feedback network 6 with a voltage reference 3 or similar voltage. The comparator can include hysteresis or not. The output of the comparator provides a signal in a digital form to be processed by a logic circuit 5 to drive the output switching stage of the boost converter, indicated in FIG. 4 with the switches S6, S7 and S8.

The switches S6 and S8 are switched with the same frequency and phase φ1. In the alternate phase φ2 the switch S7 is toggled. In the phase φ1 the capacitor C5 is charged approximately at the voltage V2 and the inductor L3 is discharged. In the phase φ2 the voltage at the node 8 is boosted and the inductor is charged. During the phase φ1 the inductor current is re-circulated partially in the switch S6 and partially in the capacitor C5 through the switch S8.

Typically the feedback network 6 can have a few input signals among which the output regulated voltage 7 of the boost converter and a switching node 8. The voltage of the output node 10 of the feedback network 6 is a signal that creates the synthesis of a ripple voltage applied to the converter's output 7 by the charging and discharging of the inductor energy. The signal of the node 10 at the output of the feedback network 6 assumes the shape of a voltage ramp providing adequate overdrive to the stages of the comparator. This ramp signal has two contributions: a dc contribution that controls the output voltage of the node 7 to be at the desired value and an ac contribution that governs the switching frequency of the whole converter.

The topology and values of the components in the feedback network define the self oscillating switching frequency, the stability, and the load transient response performance of the whole converter. The switching frequency has a direct impact on the output voltage ripple and on the converter efficiency. The switching frequency can be regulated and imposed by a separate frequency control loop that can be implemented in various ways. When the switching frequency is regulated, for example by means of a PLL (Phase Lock Loop), the study of the hysteretic control loop becomes more complex and an accurate analysis can be performed by periodic state analysis to guarantee the circuit stability in all conditions.

The methods and means for regulating the switching frequency are beyond the scope of the present invention and do not affect its novelty. Several methods and techniques to regulate the switching frequency are well known to anyone skilled in the art.

The feedback network 6 is typically composed of passive components but more in general it could include active components and have different functions depending on the load conditions and on whether the converter is in CCM or DCM mode of operation. Furthermore the feedback network may include a resistor divider to scale down the output voltage to a desired voltage value or, in alternative, the scaling divider may be external to the feedback network block. As mentioned, the switching node 8 is an input to the feedback network, but a different signal could be used as well, such as the signal at the node 9 at the other terminal of the capacitor C5.

The implementation of FIG. 4 utilizes the switch S6 to achieve higher efficiency but the same general considerations are valid if the switch S6 is replaced by a simple diode as in FIG. 2 and FIG. 3. The proposed circuit topology is amenable to operate at high switching frequency because the loop does not comprise complex stability networks that introduce delays. The two main blocks in the loop are the fast comparator and the feedback network. The switching frequencies for the proposed topology can be in the order of many tens of MHz allowing much smaller inductor and capacitors values.

In the case of high switching frequencies it may be advantageous to use a diode in place of the switch S6 to optimize conversion efficiency but that is dependent on the operating currents and on the process technology available for the application. The value of the capacitor C5 has to be adequate to allow the desired transfer of energy when switching, which is generally linked to the load current.

B FIG. 5

FIG. 5 is showing the schematic of the block diagram of the pseudo-hysteretic switching boost converter according to the preferred embodiment of the invention. In particular FIG. 5 is very similar to FIG. 4, but it adds the block 11 to allow the operation of the switching power converter in DCM (Discontinuous Conduction Mode) of operation. This mode is essential to guarantee high efficiency of the converter in the case of light loads.

When the load current is low enough, the inductor current reaches the zero value. If the control loop operates in CCM the inductor current becomes negative impacting adversely the converter's efficiency. It is therefore advantageous to monitor the inductor current, turn off all the switches when the inductor current reaches zero, and resume switching when the ramp signal at the output of the feedback network 6 toggles the fast comparator 4. The inductor charging phase can then be kept active for a predetermined amount of time seeking the optimum trade-off between the switching frequency and the output voltage ripple with the purpose of maximizing the overall converter efficiency. This mode constitutes the DCM mode of operation and it is characterized by a lower switching frequency.

The lower the switching frequency the higher the output voltage ripple for a given inductor and output capacitor value. In some applications it may be desirable to allow higher output voltage ripple in order to obtain higher efficiency at light loads. The re-circulating inductor current, when the inductor is discharging its energy, is partially flowing in the switch S6 and partially in the switch S8 through the capacitor C5. However the largest portion of the inductor current is flowing in the switch S6, therefore the inductor current is monitored by sensing the current in S6 since it is accurate enough to assume that when the current in the switch S6 is approaching zero, so is the inductor current.

FIG. 5 shows the boost converter with the DCM control block 11 that monitors the inductor current by sensing the voltage of the node 8 when the switch S6 is on and whose output feeds the control logic and pre-drivers block 5. In FIG. 5 it is assumed that the supply voltage V2 is provided as well to the block 11 so that differentially the voltage drop across the switch S6 can be measured and, by knowing its on resistance, an estimate of the flowing current could be made. If and when the switch S6 is replaced by a diode the sensing of the current flowing through it may be more problematic and a small sense resistor in series to the inductor may provide the required information to operate in CCM with accurate result.

It should be noted that the circuit could be left in CCM for a few clock cycles even after a zero inductor current has been detected so that inverting the inductor current for the first few cycles after the load transient, the transient response could be improved and optimized by minimizing the amplitude of the output voltage spikes and glitches. However by keeping the low side switch S8 on for a longer time, the inductor current cannot be reversed to large values because the capacitor C5 prevents a DC current flow from occurring. This leads to the consideration that large values of the capacitor C5, although not desirable in terms of size and cost, may contribute to reduce the output voltage spikes when the output load current is abruptly decreased.

The adoption of the switch S6 in place of the diode, although more cumbersome to drive at high switching frequencies, may provide the initial surge current control at start up which is very important for battery supplied power converters. This feature is impossible to obtain with the diode. The initial phase of operation of the boost converter has to be set by means of open loop forced switching (for example by means of maximum on time of the high side switch) or by the implementation of a separate control loop distinct from the hysteretic loop. This is desirable until the output voltage has reached the target value, after which the hysteretic control loop can be phased in.

This different mode of operation when the output voltage is not close to the desired final value is inherent in the nature of the hysteretic loop for a boost converter. Possibly this could be implemented by using a multi-mode feedback network that allows soft start and adaptive operation. However this is beyond the scope of the present invention.

C FIG. 6

FIG. 6 shows the schematic of the pseudo-hysteretic boost converter with DCM mode according to an alternative embodiment of the present invention. In particular FIG. 6 is very similar to FIG. 5 with the exception of the fact that the switch S6 has one terminal connected to a separate supply (V3).

The topology of FIG. 6 allows the separation of the boost switching power converter in two sections: the first one under the supply voltage V2 and the second one under the supply voltage V3. This overcomes, at least partially the largest disadvantage of the proposed switching power converter topology of FIG. 4 and FIG. 5. In fact in the described schematics of FIG. 4 and FIG. 5 there are two extra components (an extra switch and an extra capacitor) with respect to a conventional inductive boost, adding to its cost and size.

However if the terminal of the switch S6 coupled to the supply V2 of FIG. 5 is separated and connected to a separate supply V3 as shown in FIG. 6, the converter can be operated at lower voltage V2 and boost the voltage of the second supply V3 to the voltage V2. If for instance the desired output voltage is 4.3V, V2 is 1.8V and V3 is a battery voltage varying between 2.5V and 4.0V, the switches S7 and S8 may be implemented in a smaller lithography process technology and switched at high frequency with high efficiency.

Furthermore the size of the section of the boost converter under the lower voltage V2 can be significantly smaller in silicon area and lower in cost. This may offset the increased cost and size of the extra capacitor and switch. The capacitor C5 is still required and, in fact the reduction of the voltage of a section of the boost may impose an increase of the size of the boosting capacitor C5 in order to transfer the same energy to the load, but possibly a smaller capacitor value may be utilized if the converter is operated at high frequency.

Figure 7:
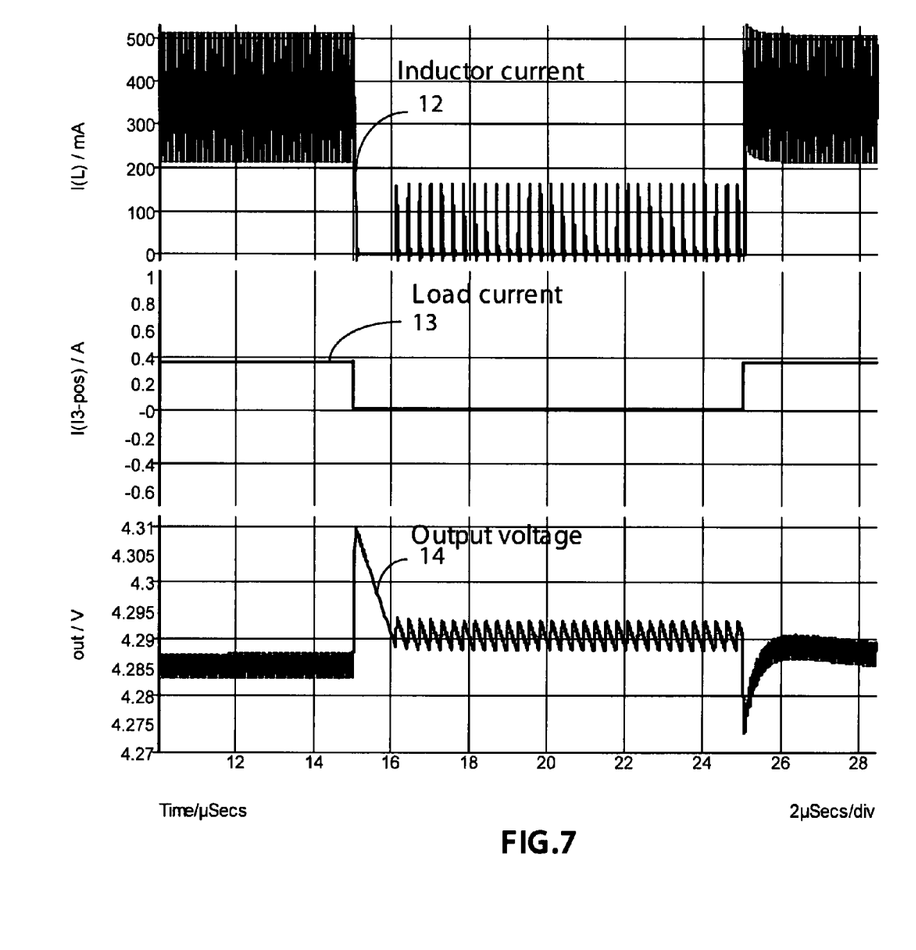
FIG. 7 shows the main voltage and current waveforms for the simulation of the circuit of FIG. 5.

D FIG. 7

FIG. 7 shows the main voltage and current waveforms of the simulation of the circuit of FIG. 5. In particular the output capacitor C6 value was 500 nF, the inductor L3 value was 150 nH and the capacitor C5 value was 10 nF. The input voltage was 3.6V. The load current was switched in 1 ns from 350 mA to 10 mA and back to 350 mA as reported in the middle waveform 13.

The waveforms 12 and 14, respectively the inductor current and the output voltage waveforms clearly show the change of mode of operation when the load transient occurs. When the load current is 350 mA the converter operates in CCM and the current ripple switches approximately from 200 mA to 500 mA. The switching frequency in CCM is 20 MHz. When the load becomes much lighter the converter switches to DCM and the inductor current has peaks of almost 200 mA at much lower frequency (about 4 MHz). When the current reaches the zero value it is kept at such for some time until the output voltage falls below a predetermined threshold.

In this specific case the output voltage ripple in DCM is not much higher in amplitude than in CCM. The lowering of the switching frequency in DCM allows lower switching losses and high conversion efficiency with light loads.

E FIG. 8

FIG. 8 shows the schematic of the hysteretic converter when operates as a buck converter according to a further embodiment of the present invention. The circuit of FIG. 8 is the same of that of FIG. 4 with the exception of the phase of the switch S6. In fact in FIG. 4 the switch S6 operates with the same frequency and phase of the switch S8, while in FIG. 8 it operates with the same phase $\phi 2$ of the switch S7. With this configuration the power converter operates as a buck providing an output voltage lower than its input voltage. In that case the boosting capacitor C5 is no longer acting as a boosting capacitor. It simply stores a portion of the inductor energy during re-circulation, and gets discharged during the inductor energy charging phase.

The voltage of the node 8 is modulated between the supply voltage V2 and the voltage at which the capacitor is discharged, therefore the Vout/Vin transfer function is equal to D, where D is the duty cycle of the converter. This transfer function is typical of the buck switching converters. However the analytic study of the converter during the re-circulating phase is not trivial because the circuit operates as a resonating one. Anyway the rest of the circuit, including the feedback circuit, is exactly the same as the one shown for the boost configuration.

The switching power converter in buck mode can operate at the same high frequency used for the converter in boost mode and its efficiency is also very high. In addition, in the case that the input voltage could vary between a value lower and one higher than the desired output voltage the converter may implement a buck boost operation by monitoring the input voltage versus the output voltage and by toggling the phase of the switch S6 to operate as a boost or as a buck power converter. This effective advantage makes this circuit topology very attractive for some applications.

When operating as a buck converter the value of the capacitor C5 can be quite small and easily be integrated in an IC (integrated circuit) but the value of the capacitor C5 affects directly the free switching frequency of the converter, since it is related to the voltage swing for the input of the feedback network. At lower capacitor values the switching frequency tends to be lower resulting in higher output voltage ripple, but a separate switching frequency control loop can be implemented to overcome this difficulty. Furthermore the switching frequency should be quite different from the self resonating frequency of the LC network during re-circulation.

Also in this step down configuration the DCM mode can be easily implemented by turning off all the switches when the inductor current reaches the zero value. In this mode the re-circulation inductor current is flowing in the low side switch S8 therefore a simple monitoring of the voltage of the node 9 is sufficient to indicate when the inductor current reaches the null value to start the DCM mode of operation.

Figure 9:
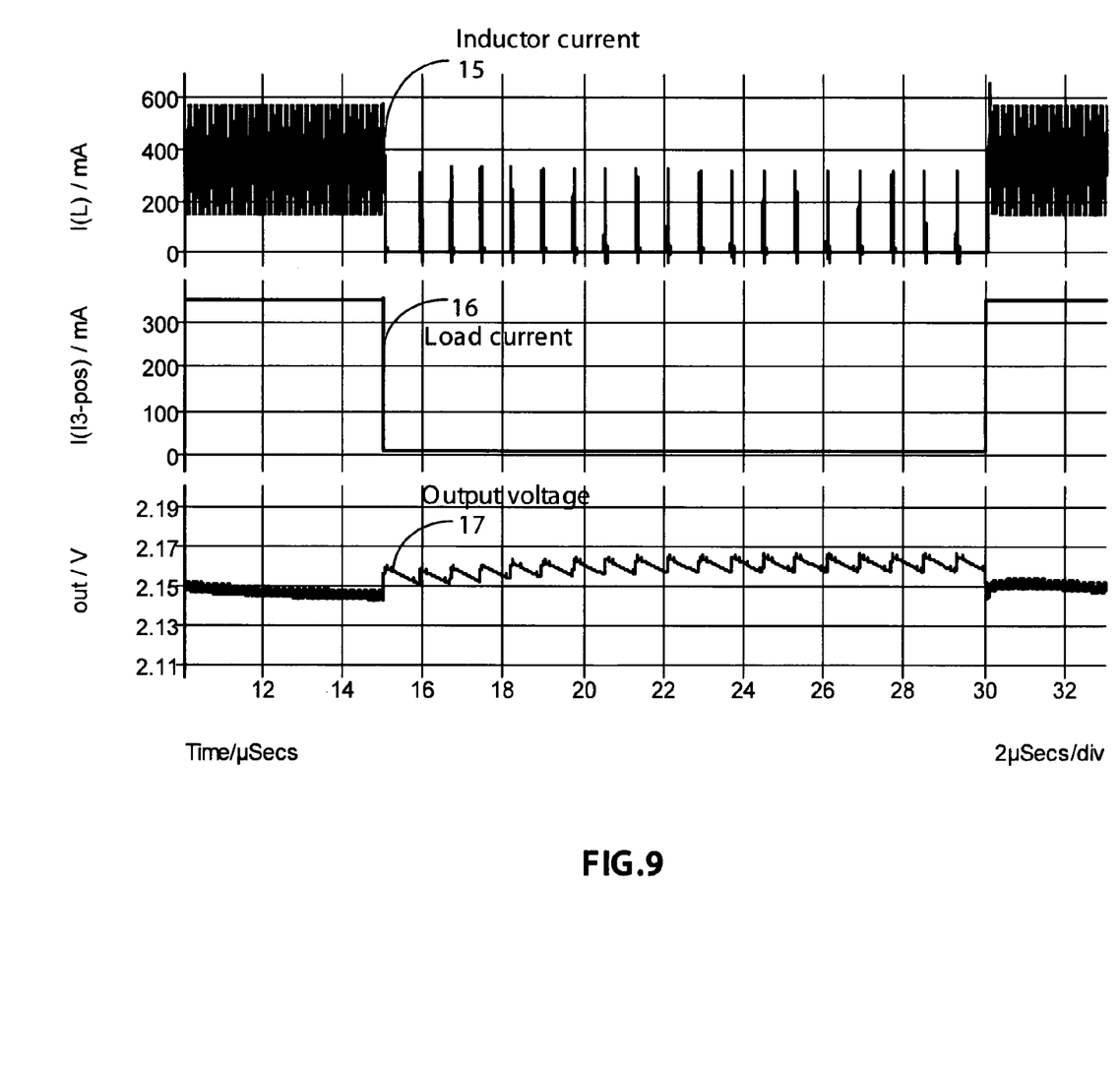
FIG. 9 shows the main voltage and current waveforms for the simulation of the circuit of FIG. 8.

F FIG. 9

FIG. 9 shows the main voltage and current waveforms of the simulation of the circuit of FIG. 8. In this case the output voltage is regulated at about 2.15 V while the input voltage was 3.6V to confirm the step down operation of the converter. The output capacitor C6 value was 1 uF, the inductor L3 value was 150 nH and the capacitor C5 value was 1 uF. The load current was switched in 1 ns from 350 mA to 10 mA and back to 350 mA as reported in the middle waveform 16.

The waveforms 15 and 17, respectively the inductor current and the output voltage waveforms clearly show the change of mode of operation when the load transient occurs. When the load current is 350 mA the converter operates in CCM and the current ripple switches approximately from 200 mA to 600 mA. The switching frequency was 15 MHz in CCM. When the load becomes much lighter the converter switches to DCM and the inductor current has peaks of about 350 mA at much lower frequency (about 1 MHz). When the current reaches the zero value it is kept at such for some time until the output voltage falls below a predetermined threshold.

In this specific case the output voltage ripple in DCM is higher in amplitude than in CCM but the lowering of the switching frequency in DCM allows lower switching losses and high conversion efficiency with light loads.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A switching power converter comprising:
a power source;
a first switch coupled between a negative terminal of said power source and a first switching node;
a second switch coupled between said first switching node and a positive terminal of said power source;
a first capacitor coupled between said first switching node and a second switching node;

a third switch coupled between said positive terminal of said power source and said second switching node;

an inductor coupled between said second switching node and an output terminal of said switching power converter;

a second capacitor coupled between said output terminal of said switching power converter and said negative terminal of said power source;

a load coupled between said output terminal of said switching converter and said negative terminal of said power source;

a feedback network for generating a synthetic ripple signal;
wherein said synthetic ripple signal is a signal proportional to the sum of a first signal proportional to the current flowing in said inductor and of a second signal proportional to a regulated output voltage appearing at said output terminal of said switching power converter;

a comparator providing hysteretic control of said switching power converter in response to said synthetic ripple signal and to a reference signal;

a control logic circuit and a pre-driver circuit for generating signals to drive said first, second and third switches with a duty cycle in response to an output signal of said comparator and to operate said switching power converter at a switching frequency,
wherein said feedback network is comprising components to alter the operation of said switching power converter depending on a conduction mode.

2. The switching power converter of claim 1 wherein said third switch is operated in phase with said first switch and
whereby said switching power converter operates as a boost power converter regulating said output voltage to be higher than said power source voltage.

3. The switching power converter of claim 1 wherein said third switch is operated in phase with said second switch and
whereby said switching power converter operates as a buck power converter regulating said output voltage to be lower than said power source voltage.

4. The switching power converter of claim 1 wherein the current flowing in said inductor is sensed directly or indirectly;
wherein said first, second and third switches are open when the current in said inductor reaches substantially a zero value;
wherein the switching is resumed when said output voltage of said switching power converter reaches a value outside of a predetermined range, and
whereby the efficiency of said switching power converter is maintained high by lowering said switching frequency when current in said load reaches substantially low values.

5. The switching power converter of claim 1 wherein said switching frequency is maintained substantially constant in a continuous conduction mode by means of a dedicated frequency control circuit.

6. The switching power converter of claim 1 wherein said switching frequency in a continuous conduction mode is higher than 10 MHz.

7. The switching power converter of claim 1 wherein said third switch is replaced by a diode,
wherein said diode is comprising an anode and a cathode and,
wherein said anode of said diode is coupled to said positive terminal of said power source and wherein said cathode of said diode is coupled to said second switching node.

8. The switching power converter of claim 1 wherein said third switch is coupled between a second power source and said second switching node.

9. The switching power converter of claim 1 wherein said third switch is replaced by a diode,
wherein said diode has an anode and a cathode and,
wherein said anode of said diode is coupled to a positive terminal of a second power source and wherein said cathode of said diode is coupled to said second switching node.

10. The switching power converter of claim 1 wherein said feedback network is comprising components to alter the operation of said switching power converter depending on a conduction mode.

11. A method to efficiently convert power from a power source with a switching power converter comprising:
switching a first power device and a second power device with alternate phases
wherein said first power device is coupled between a negative terminal of said power source and a first switching node and,
wherein said second power device is coupled between said first switching node and a positive terminal of said power source;
switching a third power device wherein said third power device is coupled between said positive terminal of said power source and a second switching node and
wherein a first capacitor is coupled between said first switching node and said second switching node;
charging and discharging with a modulated duty cycle an inductor coupled between said second switching node and an output terminal;
generating a synthetic ripple signal in a feedback network and
wherein said synthetic ripple signal is a signal proportional to the sum of a first signal proportional to the current flowing in said inductor and of a second signal proportional to an output voltage appearing at said output terminal;
comparing said synthetic ripple signal to a reference signal by means of a comparator;
modulating said duty cycle of said three power devices in response to an output of said comparator,
whereby said output voltage appearing at said output terminal is regulated substantially independently from a load coupled between said output terminal and a negative terminal of said power source, and coupled in parallel to a second capacitor;
wherein said feedback network is comprising components to alter the operation of said switching power converter depending on a conduction mode;
wherein said three power devices operate at a switching frequency and,
wherein the modulation of said duty cycle occurs by means of an hysteretic control.

12. The method of claim 11 wherein said third power device is operated in phase with said first power device and
whereby the switching power converter according to the method of claim 11 operates as a boost power converter regulating said output voltage of said output terminal to be higher than said power source voltage.

13. The method of claim 11 wherein said third power device is operated in phase with said second power device and
whereby the switching power converter according to the method of claim 11 operates as a buck power converter regulating said output voltage of said output terminal to be lower than said power source voltage.

14. The method of claim 11 wherein said current flowing in said inductor is sensed directly or indirectly;
   wherein said first, second and third power devices are open when said current flowing in said inductor reaches substantially a zero value;
   wherein the switching is resumed when said output voltage of said output terminal reaches a value outside of a predetermined range, and
   whereby the efficiency is maintained high by means of lowering said switching frequency when current in said load reaches substantially low values.

15. The method of claim 11 wherein said switching frequency is maintained substantially constant in a continuous conduction mode by means of a dedicated frequency control circuit.

16. The method of claim 11 wherein said switching frequency in a continuous conduction mode is higher than 10 MHz.

17. The method of claim 11 wherein said third power device is replaced by a diode;
   wherein said diode has an anode and a cathode,
   wherein said anode of said diode is coupled to said positive terminal of said power source, and
   wherein said cathode of said diode is coupled to said second switching node.

18. The method of claim 11 wherein said third power device is coupled between a second power source and said second switching node.

19. The method of claim 11 wherein said third power device is replaced by a diode;
   wherein said diode has an anode and a cathode,
   wherein said anode of said diode is coupled to a positive terminal of a second power source, and
   wherein said cathode of said diode is coupled to said second switching node.

* * * * *